Patented Dec. 16, 1952

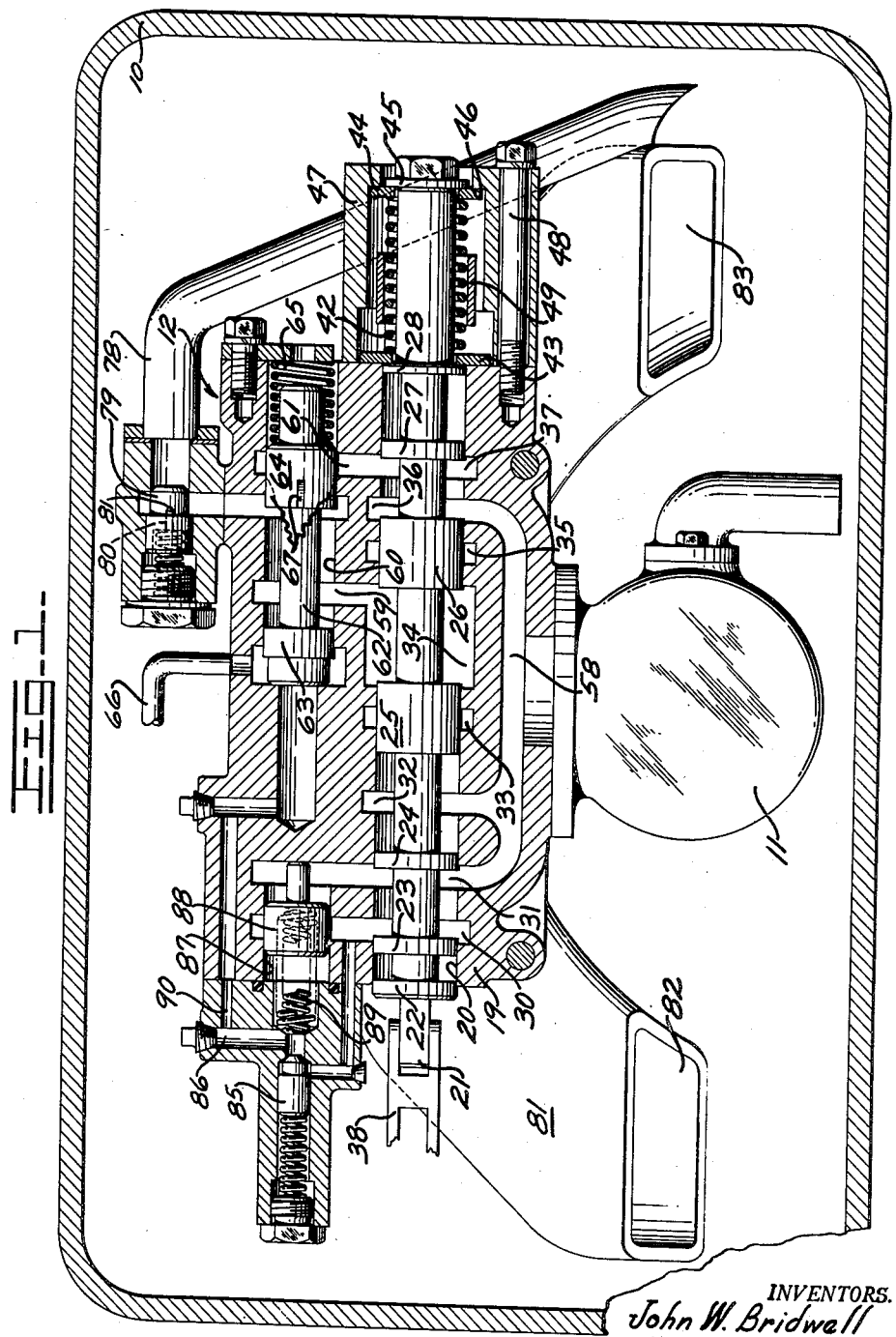

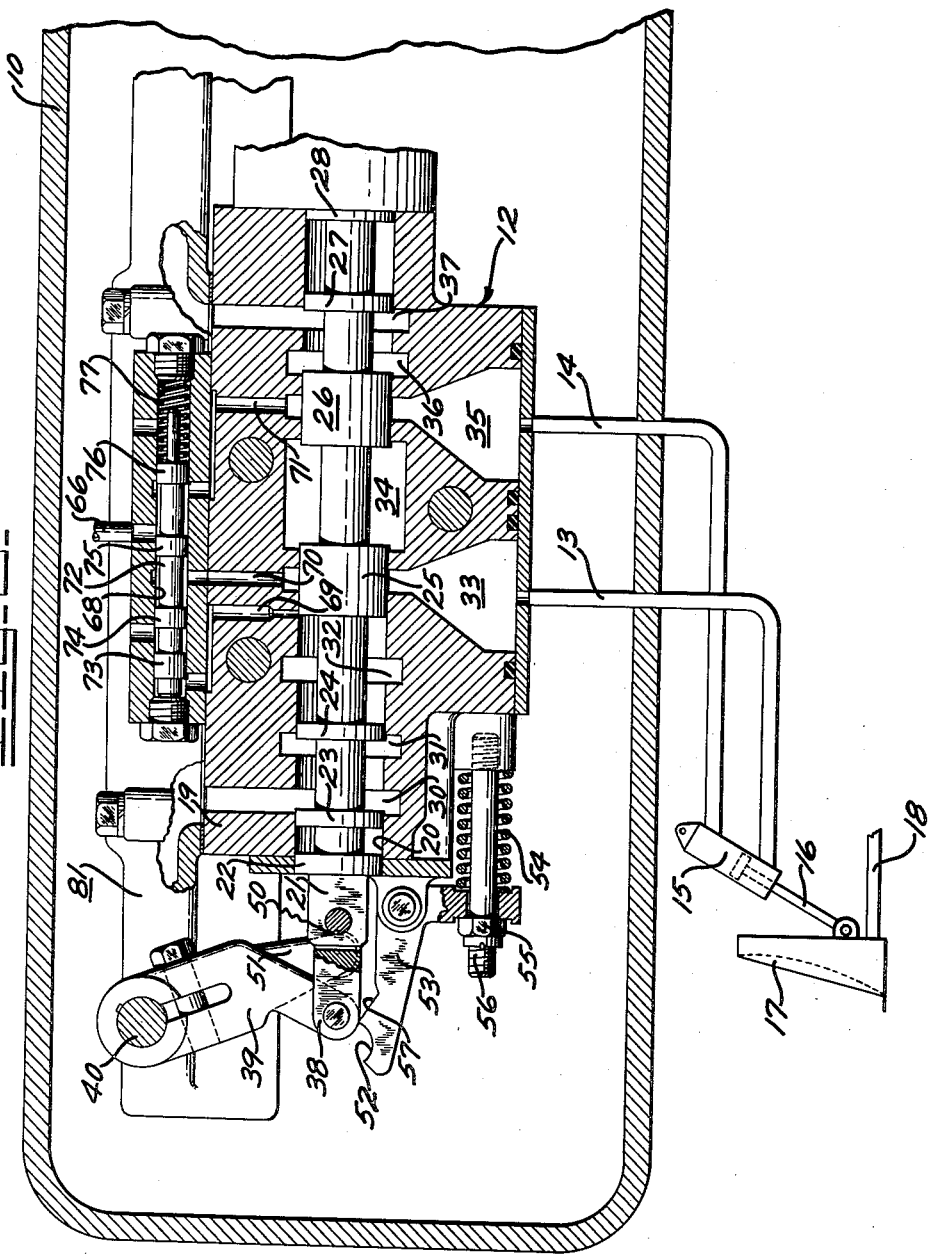

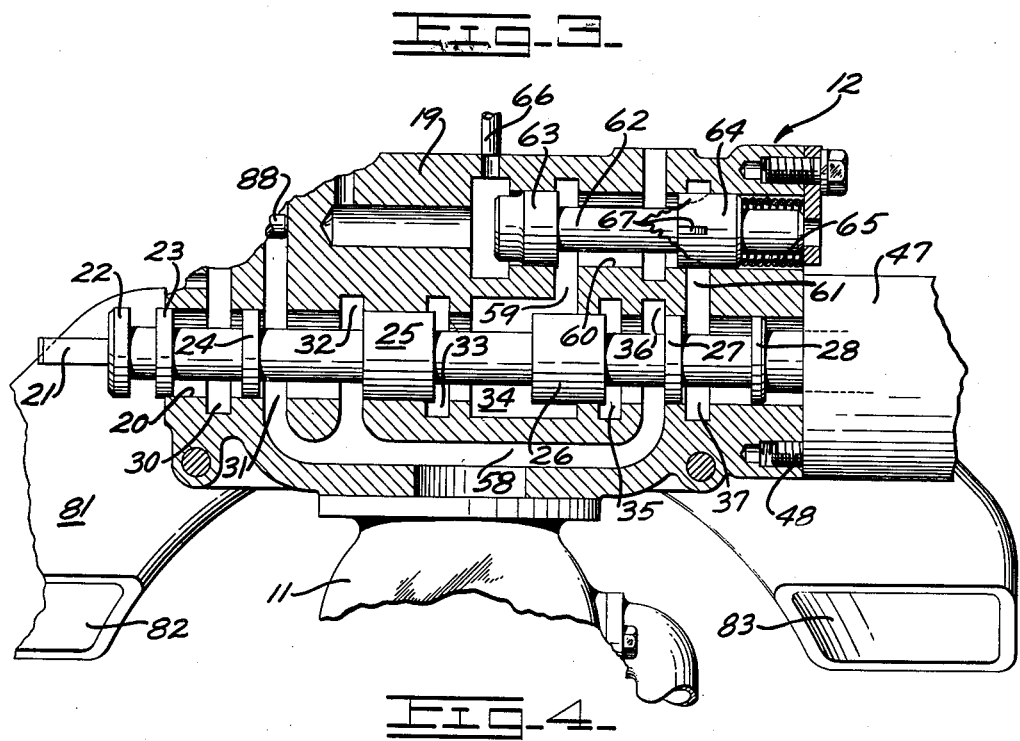
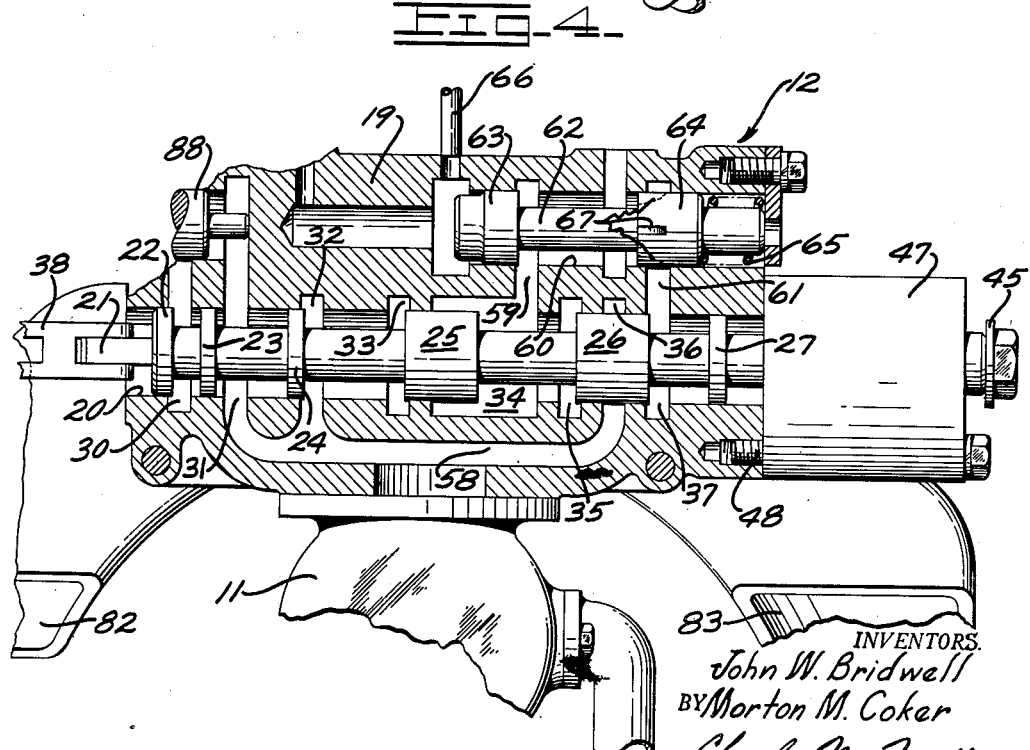

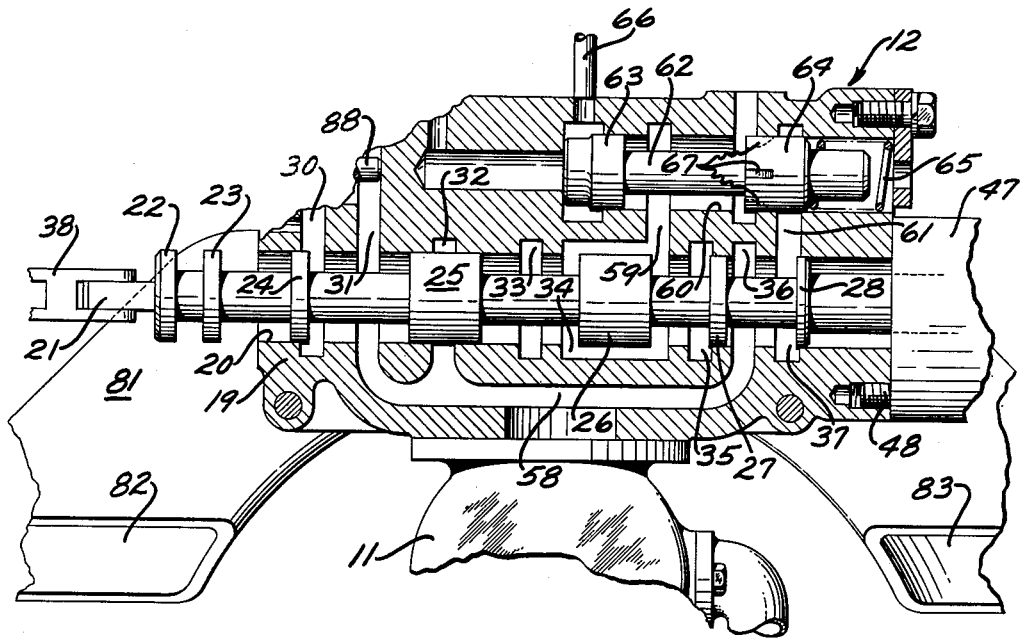
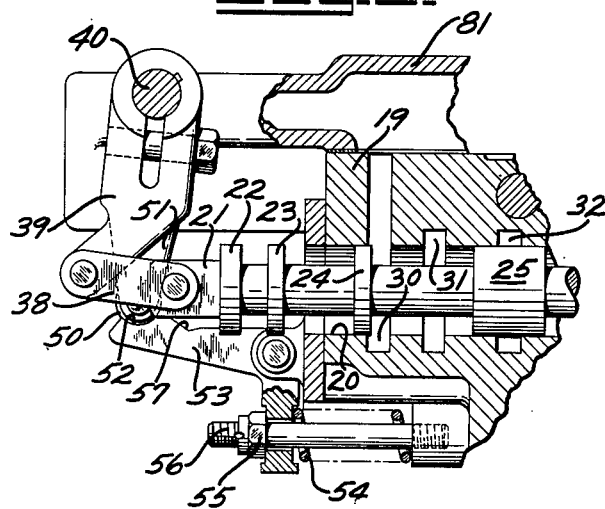

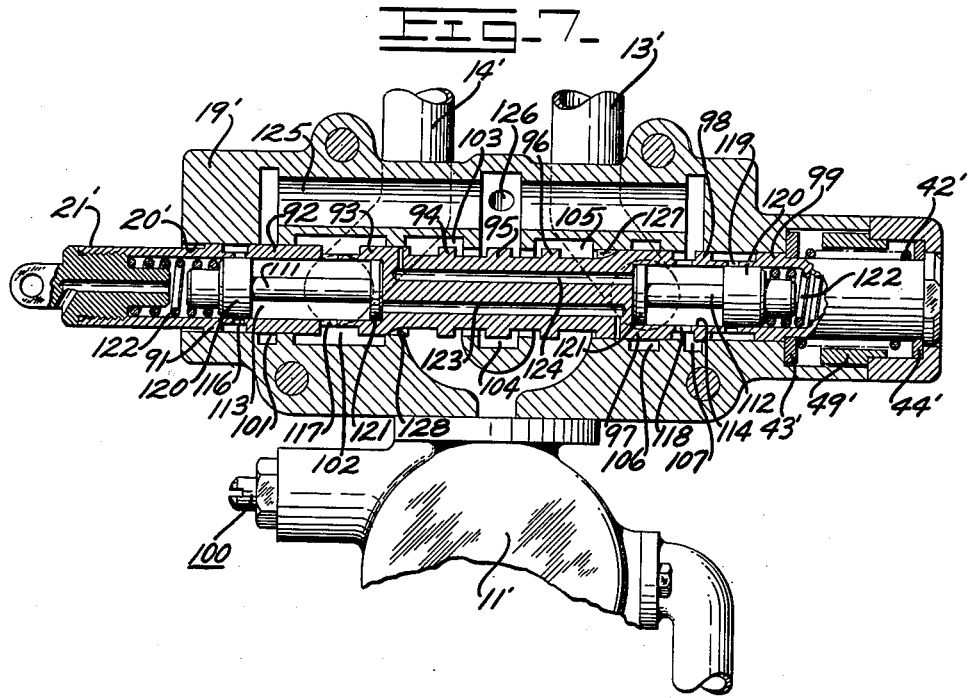
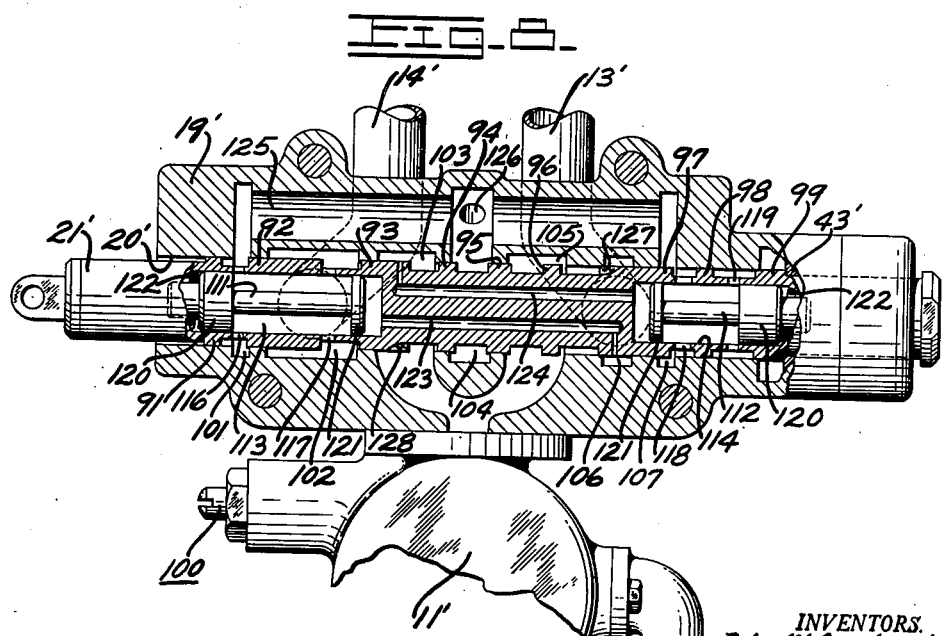

2,621,478

UNITED STATES PATENT OFFICE 2,621,478

AUTOMATIC FLOW CONTROL MECHANISM FOR HYDRAULIC POWER CIRCUIT

John W. Bridwell and Morton M. Coker, Peoria, Ill., assignors to Caterpillar Tractor Co., Peoria, Ill., a corporation of California Application March 28, 1949, Serial No. 83,966

1 Claim. (Cl. 60—52)

This invention relates to a hydraulic control mechanism for directing fluid under pressure to one or more double acting hydraulically actuated jacks.

The present invention is particularly adapted for use in connection with hydraulically actuated jacks for controlling the movement of an earth working implement such as a tractor mounted bulldozer or the like and will be disclosed herein in connection with such use. Its adaptability to other uses will, however, be readily apparent.

A hydraulic circuit for controlling the movement of a tractor mounted bulldozer or the like usually comprises one or more double acting hydraulically actuated jacks, a fluid reservoir, a pump, and a control valve for controlling the flow of fluid to and from the jacks. The control valve is usually provided with four operating positions, namely, neutral or hold, raise, lower, and a so-called float position in which the working implement is free to move in response to external forces. One of the principal difficulties encountered in conventional hydraulic systems of this type is that under certain operating conditions, the load on the working implement causes it to move faster than the rate at which the pump can supply fluid to the jacks. As a result, the fluid displaced from the jacks is returned to the supply tank at a higher rate than it is withdrawn by the pump thus causing excessive pressures which may result in damage in the hydraulic system, as for instance, bursting of the fluid supply tank.

It is one of the objects of this invention to provide an improved control valve for a hydraulic circuit having means to prevent fluid displaced from the jacks from returning to the supply tank at a greater rate than fluid is being withdrawn therefrom.

It is another object of this invention to provide an improved manual control mechanism for a four position hydraulic control valve which includes means to permit the operator to identify the operating position of the valve by its feel, and means for returning the valve to its neutral position except when it is in the float position.

Further objects and advantages of this invention will be apparent from the following description wherein reference is made to the accompanying drawings.

In the drawings:

Fig. 1 is a vertical longitudinal sectional view through a control valve embodying the present invention;

Fig. 2 is a horizontal longitudinal sectional view of the control valve shown in Fig. 1, illustrating schematically its connection with a double acting hydraulic jack for controlling the movement of a bulldozer blade;

Fig. 3 is a fragmentary sectional view similar to Fig. 1 illustrating the valve spool in its position to effect lowering of the bulldozer;

Fig. 4 is a similar view illustrating the valve spool in its position to raise the bulldozer;

Fig. 5 is a similar view illustrating the valve spool in its float position;

Fig. 6 is a fragmentary sectional view similar to Fig. 2 illustrating the valve spool and its control linkage in the float position;

Fig. 7 is a longitudinal sectional view through a modified form of the control valve illustrated in Figs. 1 through 6; and Fig. 8 is a longitudinal sectional view similar to Fig. 7 illustrating the valve spool in its raised position.

Figs. 1 and 2 of the drawings illustrate a hydraulic circuit comprising a fluid supply tank 10, a pump 11, and a control valve 12 for directing fluid under pressure through power lines 13 and 14 to either end of a double acting hydraulic jack, illustrated schematically in Fig. 2 as comprising a cylinder 15 containing a reciprocal piston rod 16. The cylinder may be pivotally supported from a tractor or the like (not shown) while the piston rod is pivotally secured to a bulldozer blade 17. The bulldozer blade is provided with a pair of push arms 18 which at their opposite ends are pivotally secured to the tractor in a manner to permit raising or lowering of the bulldozer in response to movement of the piston rod 16. The control valve 12 comprises a valve body 19 having an elongated bore 20 for the reception of a valve spool 21 adapted for sliding movement therein. The valve spool is provided with a plurality of spaced collars 22, 23, 24, 25, 26, 27, and 28, which upon sliding movement of the valve spool are adapted to cooperate with spaced recesses 30, 31, 32, 33, 34, 35, 36, and 37 to effect direction of fluid from the pump through the control valve in a manner presently to be described.

Sliding movement of the valve spool 21 is accomplished by means of a manually controlled linkage comprising a link 38, pivotally connected to the valve spool and at its opposite end to a lever 39 clamped against rotation on a shaft 40 extending through and rotatably supported in a wall of the supply tank 10. At its extending end, the shaft 40 may be connected to any suitable manually controlled linkage (not shown) to effect sliding of the valve spool in its bore upon rocking movement of the shaft 40. The valve spool 21 is normally urged toward its neutral or hold position as illustrated in Figs. 1 and 2 by a spring 42 embracing the opposite end of the valve spool and interposed between a pair of thrust washers 43 and 44. The washer 43 is engageable by collar 28 and the end of the valve body 19, while the washer 44 engages a collar 45 adjacent the end of the valve spool and a shoulder 46 formed at the end of a cover 47 enclosing the mechanism which is secured to the valve body as by cap screw 48. The maximum axial displacement of the valve spool is limited by a sleeve 49 embracing the spring 42 and interposed between the washers 43 and 44.

Upon movement of the valve spool to its float position as is illustrated in Figs. 5 and 6, it is held against the force of the spring 42 urging it toward the neutral position by a roller 50 carried in an arm 51 extending from the lever 39 which is adapted to engage a detent 52 provided in one end of a bell-crank 53. The bell-crank is pivotally supported from the valve body and is normally held in the position illustrated by means of a spring 54 and a nut 55 carried on a stud 56 extending from the valve body through an opening in the crank. Spring 54 urges the bell-crank toward clockwise rotation as viewed in Fig. 6, which rotation is limited by the nut 55. The bell-crank is provided with a ramp 57 adjacent the detent 52 for engagement by the roller as the valve spool is moved to its lowering position. Further movement of the valve spool to the left, as viewed in Fig. 2, is opposed by the spring 54 which permits the operator to positively identify the float position by feel. Upon reception of the roller 50 in the detent 52, the valve spool is held in the float position by the detent.

Figs. 1 and 2 illustrate the valve spool in its neutral or hold position in which fluid under pressure from the pump is directed through a fluid inlet passage 58 to the recesses 31, 32 and 36 in the bore 20. Recesses 31 and 36 are in direct communication with recesses 30 and 37 respectively which in turn are open to a manifold 81 thru which all of the fluid from the pump is returned to the supply tank 10. The manifold is of relatively large cross-sectional area and is provided with a pair of spaced outlets 82 and 83 to reduce the velocity and control the direction of the returning fluid thus minimizing turbulence and aeration of the fluid in the tank. In this position, fluid in power lines 13 and 14 is prevented from returning to the tank by the collars 25 and 26 respectively.

To lower the bulldozer blade, the valve spool is moved to the left to the position illustrated in Fig. 3. In this position, fluid from the pump is prevented from returning to the supply tank through recesses 30 and 37 by the collars 24 and 27 respectively and pressure from the pump is directed through recesses 36, 35 and power line 14 to the upper end of the jack cylinder 15 extending the piston rod 16. The fluid displaced from the lower end of the jack cylinder flows through power line 13 and recess 33 into recess 34. Recess 34 communicates by way of a passage 59 with an elongated bore 60 which in turn communicates with recess 37 by way of a passage 61. From the recess 37, the displaced fluid is returned to the supply tank through the manifold 81.

In order to prevent the fluid displaced from the jack returning to the supply tank at a rate greater than that at which fluid is withdrawn and directed to its opposite end by the pump, a counterbalance valve 62 is disposed for sliding movement in the bore 60. The counterbalance valve 62 is provided with spaced collars 63 and 64 for controlling the flow of displaced fluid through the bore 60 and is normally urged toward its closed position, illustrated in Fig. 1, by means of a spring 65 interposed between the collar 64 and the adjacent end of the bore. In its closed position, the collar 64 prevents communication between the bore 60 and recess 37. The counterbalance valve is adapted to be moved to its open position as illustrated in Fig. 3 by fluid pressure in either power line receiving pump output which is transmitted to the end of the bore 60 adjacent the collar 63 through a pipe 66. In its open position, the displaced fluid flows through spaced metering notches 67 provided in collar 64 into recess 37 and thence to the supply tank. Thus, the displaced fluid from the jack is free to return to the supply tank only when there is sufficient pressure in one of the power lines acting on the collar 63 to compress the spring 65.

Referring now to Fig. 2, at its opposite end the pipe 66 communicates with an elongated bore 68 which also communicates with the bore 20 containing the valve spool 21, recess 33 communicating with power line 13, and recess 35 communicating with power line 14 by way of passages 69, 70, and 71, respectively. A shuttle valve 72 is disposed for sliding movement in the bore 68 and is provided with spaced collars 73, 74, 75 and 76 which, upon sliding movement of the valve, permit communication between the pipe 66 and either passage 70 or passage 71. The shuttle valve is normally held in the position illustrated in Fig. 2 by a spring 77 interposed between the collar 76 and the end of the bore 68. In this position, the pipe 66 is in communication with passage 71 which in turn communicates with the recess 35, thus fluid pressure in power line 14 may be transmitted to the bore 60, moving the counterbalance valve to its open position as described in the following paragraph.

To raise the bulldozer blade, the valve spool is moved to the right to the position illustrated in Fig. 4. In this position, fluid is prevented from returning to the supply tank through recesses 30 and 37 by collars 23 and 26 respectively and the entire output of the pump is directed through recess 32, recess 33, and power line 13 to the lower end of the jack cylinder 15 retracting the piston rod 16. In this position, power line pressure in the bore 20 between collars 24 and 25 is transmitted through passage 69 (Fig. 2) moving the shuttle valve to the right, providing communication between passage 70 and pipe 66. Fluid pressure in recess 33 is then transmitted through pipe 66, moving the counter-balance valve 62 to its open position permitting the fluid displaced from the upper end of the jack to return to the supply tank by way of power line 14, recess 35, recess 34, bore 60, recess 37 and manifold 81.

Fig. 5 illustrates the valve spool moved to its position to permit floating of the bulldozer blade. In this position, the entire output of the pump is returned to the supply tank by way of recesses 30 and 37 and as recesses 33 and 35 are open to each other, fluid is free to flow back and forth between opposite ends of the jack in response to raising and lowering movements of the bulldozer blade. Because of the volume occupied by the piston rod 16, movement of the bulldozer blade upwardly displaces a greater quantity of fluid from the upper end of the cylinder than can be received in its lower end. The resultant pressure in the bore 20 between the collars 25 and 27 actuates the shuttle valve 72 to the right as viewed in Fig. 2 permitting pressure in recess 33 to be transmitted through passage 70 and pipe 66, moving the counterbalance valve 62 to its open position permitting the excess fluid from the upper end of the cylinder to be returned to the supply tank through the bore 60. In a like manner, movement of the bulldozer blade downwardly displaces a smaller volume of fluid from the lower end of the cylinder than is required to fill its upper end. This movement results in a lower pressure in the bore 20 between the collars 25 and 27 than is present in the supply tank. Under this condition, make-up fluid is withdrawn from the supply tank through a pipe 78 (Fig. 1) which communicates with the bore 60 containing the counter-balance valve. The pipe 78 is normally closed by a spring-loaded check valve 79, which is adapted to be opened by the pressure differential between the bore 20 and the supply tank. The pressure in the bore 20 is communicated to the back of the valve 79 or to its spring chamber through the small bleed passage shown at 80 terminating in an orifice 81.

The maximum pressure in the power lines is limited by a spring-loaded relief valve 85 disposed within a passage 86 providing communication between the bore 60 containing the counter-balance valve and recess 30 which is open to the supply tank. Passage 86 also communicates with a bore 87 providing communication between recesses 30 and 31. Communication between recesses 30 and 31 is normally prevented by means of a dump valve 88 which is urged toward the closed position illustrated in Fig. 1 by means of a spring 89 and power line pressure in the passage 86. In the event that pressure in either of the power lines exceeds a predetermined value, the relief valve 85 is opened, permitting fluid in the passage 86 to be discharged into the recess 30. Upon opening of the relief valve, the pressure in the bore 87 is reduced by virtue of a restricting orifice 90 interposed in the passage 86 between the relief valve and the bore 60. When the pressure in bore 87 is reduced, the dump valve 88 is moved to its open position by pump pressure present in recess 31 thus permitting direct communication between recess 31 and recess 30 which is open to the supply tank.

The dump valve 88 also serves to relieve excessive pump pressure occurring in the recess 31 due to a blocked condition occurring when the valve spool is moved from its neutral position to either raise or lower the bulldozer. This pressure is the result of spacing collars 23 through 27 from each other so that during movement of the valve spool in either direction away from neutral, it passes through a position wherein the power lines and return passages are prevented from communicating with each other and also with the pump. This spacing of the collars is provided to preclude the possibility of either of the power lines being open to a discharge passage before full pump pressure is directed through one of the power lines as might otherwise occur due to manufacturing tolerances. For example, during movement of the valve spool from the neutral position illustrated in Fig. 1 to the raise position illustrated in Fig. 4 directing fluid from the pump through power line 13, if the collar 25 opened recess 33 to the bore 20 before the collar 26 closed the recess 36 to recess 37 and collar 23 closed the recess 31 to recess 30, it would be possible for fluid in power line 13 to return directly to the tank by way of recesses 30 and 37. Under this condition, the bulldozer would be lowered by its own weight instead of raised and if the valve spool were maintained in this position for any length of time, damage to the tank might occur.

Figs. 7 and 8 illustrate a modification of the control valve illustrated in Figs. 1 through 6 in which like parts are identified by the same reference characters primed. In this modified form, the valve body 19' is provided with an elongated bore 20' for the sliding reception of a valve spool 21'. The valve spool is provided with spaced collars 91, 92, 93, 94, 95, 96, 97, 98, and 99, which upon sliding movement of the valve spool are adapted to cooperate with recesses 101, 102, 103, 104, 105, 106, and 107 provided in the bore 20' to effect direction of fluid under pressure from the pump 11' through the control valve in a manner to be described. In this modification, the maximum pressure in the hydraulic system is limited by a relief valve indicated at 100 associated with the pump 11'. The construction and operation of this relief valve are conventional and need not be illustrated.

The principal difference between the control valve 12' and the control valve 12 illustrated in Figs. 1 through 6 is that the return of fluid displaced from the jacks to the supply tank is controlled by a pair of check valves 111 and 112 disposed for sliding movement in spaced counterbores 113 and 114 provided in the valve spool 21'. Counterbore 113 communicates with the bore 20' by way of ports 116 provided in the valve spool between collars 91 and 92 and through ports 117 between collars 92 and 93. Counterbore 114 communicates with bore 20' through ports 118 provided in the valve spool between collars 97 and 98 and ports 119 between collars 98 and 99. Each of the check valves is provided with a pair of spaced collars 120 and 121, which upon sliding movement of the check valve, are adapted to control the flow of displaced fluid through their respective counterbores. Each of the check valves is normally urged toward the closed position as is illustrated in Fig. 7 by means of a spring 122 interposed between the collar 120 and the end of the counterbores. The check valve 111 is adapted to be moved to its open position by fluid pressure transmitted through a passage 123 in the valve spool providing communication between the end of the counterbore 113 adjacent the collar 121 and the bore 20' adjacent the periphery of the collar 97. The check valve 112 is adapted to be moved to its open position by fluid pressure transmitted through a passage 124 in the valve spool providing communication between the end of the counterbore 114 adjacent collar 121 and the bore 20' adjacent the periphery of the collar 93.

Fig. 7 illustrates the valve spool in its neutral or hold position. At this time, all of the fluid from the pump 11' enters recesses 103 and 105 which are open to recess 104. The recess 104 communicates with a passage 125 providing communication between recesses 101 and 107 and which also is open to the supply tank by way of a passage 126. In this position, fluid in the power line 13' and 14' is prevented from returning to the supply tank by the collars 92, 93, and 97.

Fig. 8 illustrates the valve spool in position to effect raising of the bulldozer. In this position, the fluid in recesses 103 and 105 is prevented from returning to the tank through recess 104 by the collars 94 and 95 and pressure from the pump is directed through metering notches 127 provided in the collar 97 to recess 106. From the recess 106, the fluid is directed to the lower end of the jack through power line 13'. Fluid pressure in recess 106 is transmitted through the passage 123, moving the check valve 111 to its open position as illustrated, which permits the fluid displaced from the upper end of the jack to return to the tank by way of power line 14', recess 102, port 117, counterbore 113, port 116, recess 101, passage 125, and passage 126.

The bulldozer may be lowered by moving the valve spool toward the left as viewed in Fig. 7 until the recess 103 is open to recess 102 communicating pressure from the pump through metering notches 128 provided in collar 93, recess 102, and power line 14' to the upper end of the jack. In this position, fluid pressure in recess 102 is transmitted through the passage 124, moving the check valve 112 to its open position permitting the displaced fluid from the jack to return to the tank by way of power line 13', recess 106, counterbore 114, recess 107, and passage 125.

The float position may be obtained by movement of the valve spool further to the left from the lowering position until the collar 94 prevents communication between recesses 102 and 103 and the collar 97 prevents communication between recesses 105 and 106. In this position, the entire output of the pump is returned to the tank through recess 104 and passage 126. At this time, recesses 102 and 106 are open to recesses 101 and 107 respectively, which in turn are in direct communication by way of the passage 125 permitting free flow of fluid to either end of the jack. The difference in the quantity of fluid displaced from opposite ends of the jack during floating due to the volume occupied by the piston rod is either added or discharged through the port 126.

The modification of the control valve illustrated in Figs. 7 and 8 is particularly adapted for use in hydraulic systems having a relatively small capacity. Its use in conjunction with hydraulic systems of relatively large capacity is also possible, but may in some cases prove undesirable because of the necessity of a rather large valve spool to accommodate counterbores of sufficient size to accommodate the required fluid flow.

We claim:

In a hydraulic circuit comprising a fluid supply tank, a pump for supplying fluid under pressure to a pair of power lines, each of which communicates with one end of a double acting hydraulic jack, a control valve for controlling the flow of fluid to and from the jack, and means for preventing the return of fluid displaced from the jack to the supply tank at a greater rate than fluid being directed to the opposite end of the jack comprising a fluid return passage, a counter-balance valve normally closing said passage and adapted to be opened by fluid pressure in the power line directing fluid from the pump to the jack, means for automatically connecting the passage containing the counter-balance valve only with the power line directing fluid from the pump to the jack, said last means including a shuttle valve normally providing communication between the passage containing the counter-balance valve and one of the power lines and adapted to be moved to a position providing communication between said passage and the opposite power line by fluid pressure in said opposite power line when it is receiving fluid from the pump.

JOHN W. BRIDWELL.
MORTON M. COKER.

REFERENCES CITED

The following references are of record in the file of this patent:

UNITED STATES PATENTS

| Number | Name | Date |
|---|---|---|
| 2,264,375 | Hill et al. | Dec. 2, 1941 |
| 2,320,905 | Bateholts | June 1, 1943 |
| 2,362,713 | Mott | Nov. 14, 1944 |
| 2,396,643 | De Ganahl | Mar. 19, 1946 |
| 2,399,756 | Mott | May 7, 1946 |
| 2,451,013 | Ziskal et al. | Oct. 12, 1948 |
| 2,477,669 | Stephens | Aug. 2, 1949 |
| 2,496,036 | Christensen | Jan. 31, 1950 |
| 2,504,665 | Douglas | Apr. 18, 1950 |